United States Patent [19]

Stewart

[11] 4,128,269
[45] Dec. 5, 1978

[54] TELESCOPING ROOM FOR TRAVEL TRAILERS

[75] Inventor: Bonner B. Stewart, Salem, Oreg.

[73] Assignee: Hazel F. Stewart, Salem, Oreg.

[21] Appl. No.: 761,295

[22] Filed: Jan. 21, 1977

[51] Int. Cl.² .............................................. B60P 3/32
[52] U.S. Cl. ..................................... 296/23 C; 52/67
[58] Field of Search .......................... 296/23 C; 52/67

[56] References Cited

U.S. PATENT DOCUMENTS

| 2,704,223 | 3/1955 | Houdart | 52/67 |
| 2,732,251 | 1/1956 | Meaker | 296/23 C |
| 2,813,747 | 11/1957 | Rice | 296/23 C |
| 2,901,282 | 8/1959 | Meaker | 296/23 C |
| 3,089,310 | 5/1963 | Torti | 52/67 |

*Primary Examiner*—Philip Goodman
*Attorney, Agent, or Firm*—Oliver D. Olson

[57] ABSTRACT

A room section having a ceiling, floor, opposed side walls and an outer end wall, fits freely in an opening in a wall of a travel trailer for reciprocative movement between a position extended from the trailer, to provide increased living area, and a position retracted into the trailer for travel. The room section is supported for such movement by mechanism located under the trailer floor and connected to the room section at the outer wall of the latter.

7 Claims, 6 Drawing Figures

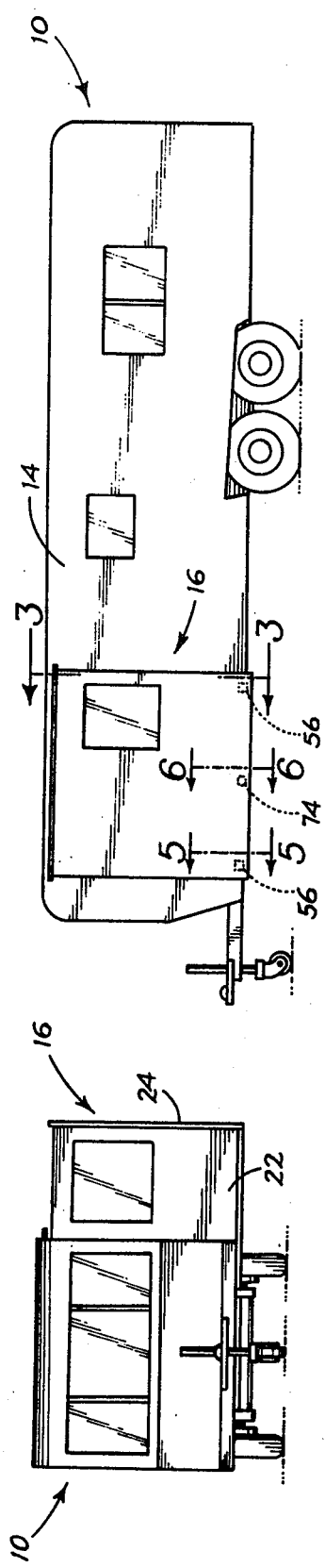
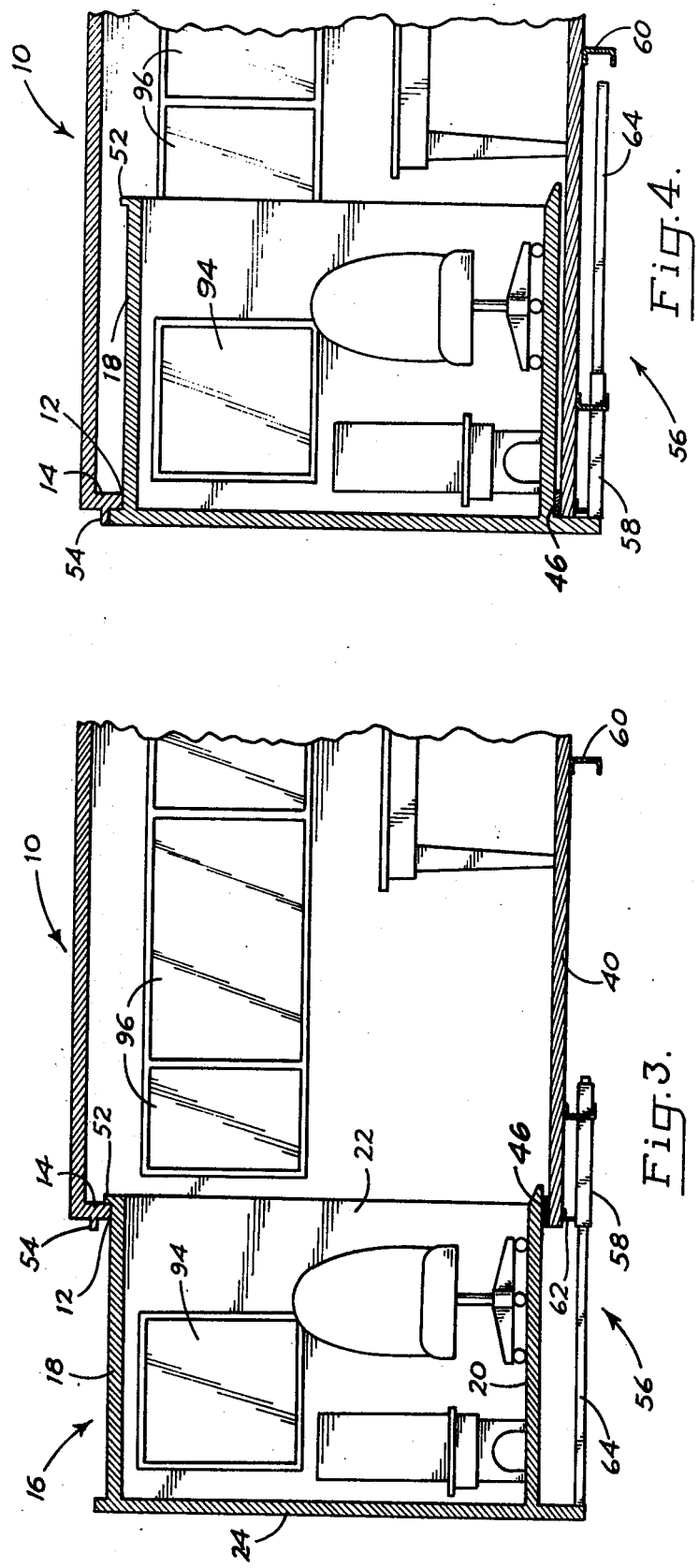

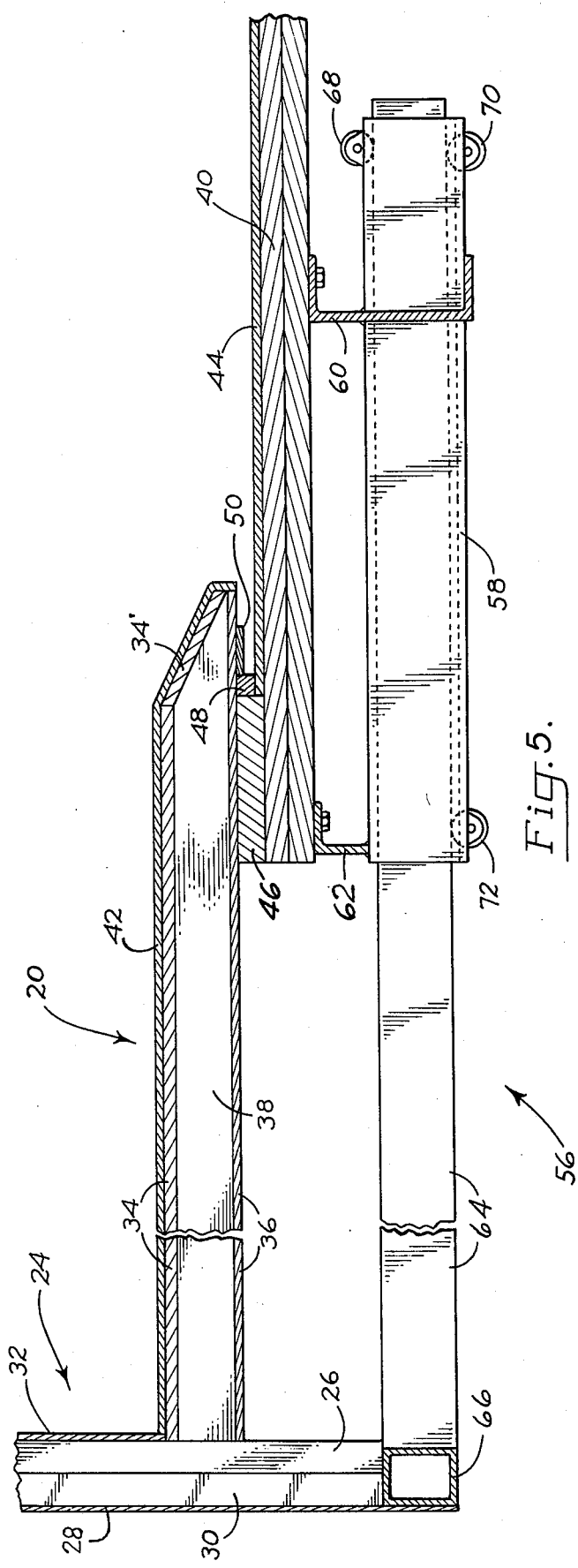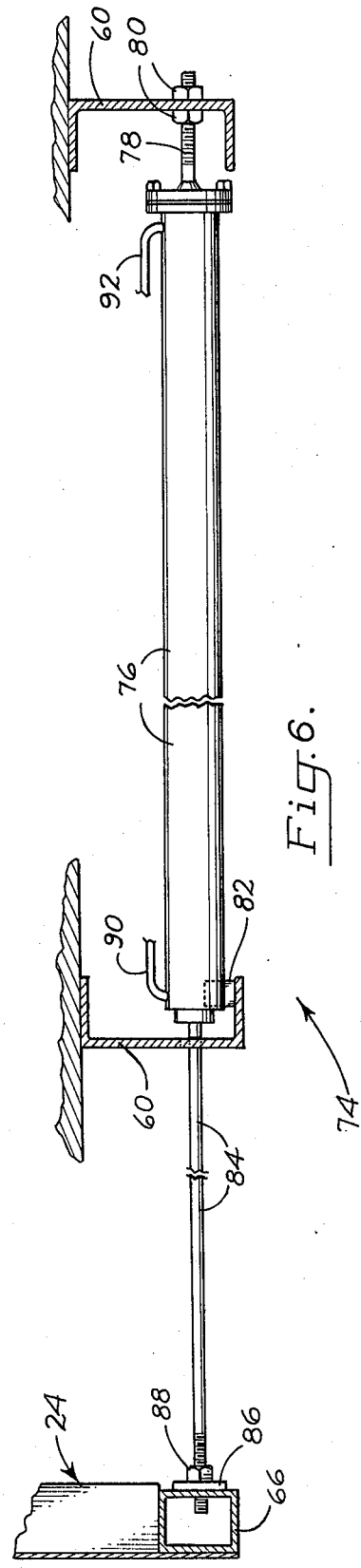

TELESCOPING ROOM FOR TRAVEL TRAILERS

BACKGROUND OF THE INVENTION

This invention relates to expandable travel trailers, and more particularly to a telescoping room for easy incorporation into travel trailers and the like.

Travel trailers and other similar vehicles have been provided heretofore with telescoping rooms for increasing the living space. However, the mechanisms by which such rooms have been supported and moved relative to the trailer have been quite complex and have required considerable modification of the trailer itself, both factors contributing to excessive costs in providing the additional space.

SUMMARY OF THE INVENTION

In its basic concept, this invention provides a travel trailer with a telescoping room section which fits freely in an opening provided in a wall of a trailer for reciprocative movement between extended and retracted positions by support mechanism which is located under the trailer and connects to the room section at the outer wall thereof.

It is by virtue of the foregoing basic concept that the principal objective of this invention is achieved; namely, to overcome the aforementioned disadvantages and limitations of the prior art telescoping rooms for trailers.

Another important objective of this invention is to provide a telescoping room section for a travel trailer or the like which requires minimum modification of the trailer for incorporation of the room section and its support and drive mechanism.

A further objective of this invention is the provision of a telescoping room section for a travel trailer which is of simplified construction for economical manufacture and is capable of incorporation into a travel trailer with speed and facility.

The foregoing and other objects and advantages of this invention will appear from the following detailed description, taken in connection with the accompanying drawings of a preferred embodiment.

BRIEF DESCRIPTION OF THE DRAWINGS

FIG. 1 is a view in side elevation of a travel trailer having incorporated therewith a telescoping room embodying the features of this invention.

FIG. 2 is a front elevation as viewed from the left in FIG. 1.

FIG. 3 is a fragmentary sectional view taken on the line 3—3 in FIG. 1.

FIG. 4 is a fragmentary sectional view similar to FIG. 3 showing the room section in its retracted position.

FIG. 5 is a fragmentary, foreshortened, sectional view of one of the support and guide members for the room section, taken on the line 5—5 in FIG. 1.

FIG. 6 is a fragmentary, foreshortened, sectional view of drive mechanism for moving the room section, taken on the line 6—6 in FIG. 1.

DESCRIPTION OF THE PREFERRED EMBODIMENT

Referring to the drawings, the telescoping room of this invention is shown associated with a conventional travel trailer 10. The latter is provided with an opening 12 in a desired one of its outside walls, shown to be a side wall 14, for reception of a telescoping room 16 in accordance with this invention.

The opening 12 is arranged to receive the room section freely but snugly. The opening extends from adjacent the ceiling of the trailer downwardly to the floor thereof.

The room section 16 includes a ceiling 18, a floor 20, opposed side walls 22 and outer end wall 24. The inner end of the room is open for access to the trailer. Preferably, the outer end wall extends beyond the perimeter of the opening 12 to cooperate with the wall 14 in forming a weather tight seal.

The construction of the ceiling, floor, side walls and end wall is that typically employed for travel trailers. As shown in FIG. 5, the outer end wall includes end beams 26 which are separated from an outer skin 28 by spaced, intermediate studs 30. A decorative covering, such as paneling 32, faces the inner side of the structural member. The other walls 18, 20 and 22 of the room section are similarly constructed.

The floor 20 includes an upper deck 34 and a lower deck 36 separated by spaced joists 38. The inner margin portion 34' of the upper deck is angled downwardly, giving a gradual transition to the floor 40 of the trailer. A carpet 42 covers the upper deck, matching the carpet 44 of the trailer.

Located on the outer margin of the floor 40 of the trailer, across opening 12, is a support block 46 for slidably supporting the lower deck 36. The block is relatively thin so that the space between the trailer floor 40 and the lower deck 36 of the floor of the room section is minimal, for example about one-half inch. A weather seal 48 is attached to the inner edge of the block 46 to prevent entrance into the trailer of wind and rain in any position of adjustment of the room section. An abutment bar 50 is attached to the bottom of the inner margin of the lower deck in a manner for contacting seal block 46 when the room section is fully extended.

An upwardly extending flange 52 (FIGS. 3 and 4) is located at the inner edge of the top 18 of the room section. The flange abuts against wall 14 of the trailer when the room section is fully extended, to seal the top of opening 12 and to assist in supporting the fully extended room section in stable condition.

A lip 54 extends outwardly from the outer wall 14 of the travel trailer in a manner to fit over outer end wall 24 when the room section is in its fully retracted position (FIG. 4). The lip also serves to seal the top of opening 12 when the room section is retracted.

The room section is supported by a pair of spaced support and guide units 56, 56 which are attached to the frame of the trailer 10. Thus, the room section translates freely between its extended position, shown in FIGS. 2 and 3, and its retracted position, shown in FIG. 4, without bearing on the floor 40 of the trailer.

Each of the units 56 comprises an outer elongated tubular guide member 58 which extends transversely through one of the longitudinal channel beams 60 which form the main frame of the trailer. The other end of the guide member is joined to the outer margin of the trailer floor by hangers 62. In the embodiment illustrated, the pair of guide members are located adjacent the opposite sides of the sliding room section.

Each unit 56 also includes an elongated support beam 64, preferably of hollow box beam construction, arranged for free sliding fit within the associated tubular guide member 58. Interconnecting the outer ends of the pair of beams 64 is a box beam 66 which is attached to the lower margin of the outer end wall 24 of the room section. Thus, when the beams 64 are translated within the tubular guide members 58, the room section is moved between its retracted and extended positions.

Rollers are mounted on the inner and outer ends of the tubular guide members 58 in a manner to support and rotatably carry the beams 64. As best shown in FIG. 5, top and bottom rollers 68 and 70 are located at the inner end of each guide member and a lower roller 72 also is located at the outer end of each. Thus, the rollers support the inner tubular beams against lateral and angular loading and allow the room section to be translated freely, with minimum force, either manually or by a mechanical drive.

In the preferred embodiment illustrated, the room section is moved by reciprocative drive mechanism such as a double acting fluid pressure piston-cylinder unit 74 located between the pair of support and guide units 56. The inner end of the cylinder 76 is attached to the trailer frame beam 60 which is the one farther from the opening 12. It is attached by a threaded coupling rod 78 fitted with nuts 80 on each side of the beam, allowing longitudinal adjustment of the cylinder relative to the transversal dimension of the trailer.

The other end of the cylinder is supported on a saddle block 82 which is attached to the opposite frame beam 60. This end of the cylinder is not fixed rigidly to the frame, thereby allowing its longitudinal movement upon adjustment of nut 80.

The piston rod 84 of the unit 74 has a threaded terminal portion which fits into a threaded block 86 rigidly attached to beam 66. A lock nut 88 locks the rod to block 86. Thus, actuation of the piston-cylinder unit 74 causes movement of the room section between its retracted and extended positions. Fluid lines 90 and 92 supply pressurized fluid preferably hydraulic, selectively to opposite ends of the piston-cylinder unit, by a conventional control valve (not shown), to effect retraction and extension of the room section.

Before operation of the telescoping room, the location of the piston-cylinder unit 74 and the travel of its ram are adjusted by manipulation of nuts 80 and threaded portion of piston rod 84, respectively so that the room section moves fully to its retracted and extended positions upon retraction and extension, respectively, of unit 74. Once this adjustment is made it does not have to be reset under normal conditions.

When the trailer is being transported, the room section is placed in its retracted position, FIG. 4. It may be secured in this position by such means as a bolt extended through registering openings in adjacent walls of the trailer and room extension, by conventional latch mechanism mounted on adjacent walls of the trailer and room extensions for releasable interengagement, or other well-known means. The closed hydraulic system of the piston-cylinder unit serves effectively to secure the retracted position as well as the extended position.

When the trailer is to be used, the room section is moved to its extended position, (FIG. 3), by extending the piston-cylinder unit. It will be noted that since the entire room section is self contained, furnishings and wall hangings located in the room do not have to be disturbed. Also, window 94 in the room section registers with windows 96 in the trailer, allowing their full use when the room section is in its retracted position.

From the foregoing it will be apparent that the room section is supported by the support and guide units 56 and moved by the piston-cylinder unit 74, both of which units are located below the trailer floor 40 and are connected to the room section at the outer wall 24. This arrangement minimizes the modifications required of the trailer itself. Thus, the only modifications required are cutting the opening 12 in the desired trailer wall, providing openings in the frame beams 60 for the guide members 58 and drive unit members 78 and 84, and attaching the hanger 62 and support block 46 and weather seal 48.

The provision of rollers 68, 70 and 72 enables movement of the room section between retracted and extended positions with minimum effort, either manually or by a mechanical drive mechanism of minimum size.

When the room section is fully extended (FIG. 3) abutment of the flange 52 against the trailer wall 14 assists the support and guide units and piston-cylinder unit in stabilizing the room section and maintaining the floor thereof level.

The tapered term portion 34′ of the floor of the room section minimizes the transition between the floor carpets 42 and 44, for example about two inches, facilitating access between a trailer and the room section.

It will be apparent to those skilled in the art that various changes may be made in the size, shape, type, number and arrangement of parts described hereinbefore. For example, if the room section is to be provided in an opening in an end wall of a travel trailer, rather than the side wall as illustrated, support for the guide members 58 and drive cylinder 76 may be provided by beams secured to and extending transversely between the frame beams 60. A plurality of room sections may be incorporated into a trailer, if so desired. These and other modifications may be made, as desired, without departing from the spirit of this invention.

Having now described my invention and the manner in which it may be used, I claim:

1. In combination with a travel trailer or the like having a floor, upstanding side and end walls and a ceiling and an opening in one of said upstanding walls,
   (a) a room section having a ceiling, a floor, side walls, an outer end wall and an open inner end, the room section extending freely through said opening in the trailer wall,
   (b) first support means secured to the trailer under the floor thereof and including a tubular member rigidly attached to the travel trailer under the floor thereof and an elongated beam extending slidably through the tubular member and rigidly attached at its outer end to the end wall of the room section below the floor thereof for supporting the room section for reciprocation therewith between a position extending outwardly from the trailer wall and a position retracted into the trailer, and rollers rotatably mounted on the tubular member and engaging the upper and lower surfaces of said beam, and
   (c) second support means between the trailer floor and overlying room extension floor for supporting the latter above the trailer floor during reciprocation of the room section.

2. The combination of claim 1 including reciprocative drive means under the trailer interconnecting the room section and the travel trailer for moving the room section between its extended and retracted positions.

3. The combination of claim 2 wherein the drive means comprises a double-acting fluid operated piston-cylinder unit, the cylinder being attached to the travel trailer and the piston being attached to the outer end wall of the room section.

4. The combination of claim 3 including adjustment means interconnecting the piston-cylinder unit and the travel trailer for adjusting the amount of travel of the room section upon actuation of the piston-cylinder unit.

5. The combination of claim 1 wherein there are two first support means, one located near each side of the room section and one reciprocative drive means located intermediate the two first support means.

6. The combination of claim 1 wherein the second support means comprises a support member secured to the trailer floor adjacent the opening in the wall thereof slidably supporting the underside of the room extension floor for reciprocation of the room section between retracted and extended positions.

7. In combination with a travel trailer or the like having a floor, upstanding side and end walls and a ceiling and an opening in one of said upstanding walls, (a) room section having a ceiling, a floor, side walls, an outer end wall and an open inner end, the room section extending freely through said opening in the trailer wall and the floor of the room section being located above and closely adjacent the floor of the trailer and having an inner fixed margin portion angled downward toward the trailer floor, (b) first support means secured to the trailer under the floor thereof and including an elongated reciprocative member secured at its outer end to the floor section adjacent the outer end wall and below the floor thereof for supporting the room section for reciprocation therewith between a position extending outwardly from the trailer wall and a position retracted into the trailer, and (c) second support means between the trailer floor and overlying room extension floor for supporting the latter above the trailer floor during reciprocation of the room section.

* * * * *

UNITED STATES PATENT AND TRADEMARK OFFICE
CERTIFICATE OF CORRECTION

PATENT NO. : 4,128,269
DATED : 5 December 1978
INVENTOR(S) : Bonner B. Stewart

It is certified that error appears in the above-identified patent and that said Letters Patent are hereby corrected as shown below:

Column 5, line 7, "1" should read --2--.

Signed and Sealed this

Twenty-sixth Day of February 1980

[SEAL]

Attest:

SIDNEY A. DIAMOND

Attesting Officer

Commissioner of Patents and Trademarks